(12) United States Patent
Seo (10) Patent No.: US 10,782,149 B2
(45) Date of Patent: *Sep. 22, 2020

(54) SENSOR MODULE AND MOTOR COMPRISING SAME

(71) Applicant: LG INNOTEK CO., LTD., Seoul (KR)

(72) Inventor: Ja Young Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,478

(22) Filed: Apr. 10, 2019

(65) Prior Publication Data

US 2019/0234762 A1     Aug. 1, 2019

Related U.S. Application Data

(63) Continuation of application No. 15/115,216, filed as application No. PCT/KR2015/000976 on Jan. 29, 2015, now Pat. No. 10,295,369.

(30) Foreign Application Priority Data

Jan. 29, 2014    (KR) .......................... 10-2014-0011782

(51) Int. Cl.
*H02K 11/215*    (2016.01)
*G01D 5/244*    (2006.01)
(Continued)

(52) U.S. Cl.
CPC ............. *G01D 5/12* (2013.01); *G01D 5/2451* (2013.01); *G01D 5/24442* (2013.01); *H02K 11/215* (2016.01)

(58) Field of Classification Search
CPC ...... H02K 11/20; H02K 11/21; H02K 11/215; H02K 29/08; G01D 5/24442; G01D 5/2451
(Continued)

(56) References Cited

U.S. PATENT DOCUMENTS

2002/0060105 A1    5/2002    Tominaga et al.
2005/0082926 A1    4/2005    Grzywacz et al.
(Continued)

FOREIGN PATENT DOCUMENTS

EP           2626987 A2     8/2013
JP       2005-348525 A    12/2005
(Continued)

OTHER PUBLICATIONS

Lee, Machine Translation of KR101103925, Jan. 2012 (Year: 2012).*
(Continued)

*Primary Examiner* — Quyen P Leung
*Assistant Examiner* — Eric Johnson
(74) *Attorney, Agent, or Firm* — Birch, Stewart, Kolasch & Birch, LLP (57) ABSTRACT

Disclosed is a sensor module, comprising: a protrusion part of a polygonal shape formed at one side; a sensing plate including a first insertion hole, formed in the protrusion part, to which a rotational shaft is coupled; and a sensing magnet including a second insertion hole, formed to correspond to the polygonal shape, in which the protrusion part is inserted and fixed.

17 Claims, 5 Drawing Sheets

(51) Int. Cl.
*G01D 5/245* (2006.01)
*G01D 5/12* (2006.01)

(58) Field of Classification Search
USPC .................. 324/207.25; 310/68 B, 159.09
See application file for complete search history.

(56) References Cited

U.S. PATENT DOCUMENTS

| | | | |
|---|---|---|---|
| 2009/0219017 A1* | 9/2009 | Mizuta | F16C 33/7883 |
| | | | 324/207.25 |
| 2009/0275273 A1* | 11/2009 | Purohit | B24B 23/03 |
| | | | 451/357 |
| 2010/0001719 A1 | 1/2010 | Kikuchi et al. | |
| 2010/0007450 A1* | 1/2010 | Mizuta | G01P 3/487 |
| | | | 335/302 |
| 2010/0117774 A1* | 5/2010 | Steinich | G01D 5/145 |
| | | | 335/306 |
| 2012/0038348 A1 | 2/2012 | Aimuta et al. | |
| 2013/0020916 A1* | 1/2013 | Kim | H02K 29/08 |
| | | | 310/68 B |
| 2013/0026888 A1* | 1/2013 | Migita | H02K 29/08 |
| | | | 310/68 B |
| 2013/0200888 A1* | 8/2013 | Kim | G01B 7/30 |
| | | | 324/207.25 |
| 2014/0035444 A1 | 2/2014 | Jung et al. | |
| 2014/0070799 A1* | 3/2014 | Taniguchi | G01D 5/145 |
| | | | 324/207.25 |
| 2015/0130319 A1* | 5/2015 | Chang | H02K 1/2726 |
| | | | 310/156.43 |

FOREIGN PATENT DOCUMENTS

| | | | |
|---|---|---|---|
| JP | 2010-35411 A | | 2/2010 |
| JP | 2012005260 A | * | 1/2012 |
| KR | 10-2012-0007928 A | | 1/2012 |
| KR | 101103925 B1 | * | 1/2012 |
| KR | 20120073853 A | * | 7/2012 |
| KR | 10-2012-0117293 A | | 10/2012 |
| KR | 10-2013-0012446 A | | 2/2013 |
| WO | WO 2012/141383 A1 | | 10/2012 |
| WO | WO-2012141383 A1 | * | 10/2012 ........... H02K 11/215 |

OTHER PUBLICATIONS

Lee Machine Translation of KR20120073853, Jul. 2012 (Year: 2012).*
Machine Translation of JP2012005260, Jan. 2012 (Year: 2012).*
Okumura, Machine Translation of JP2005348525, Dec. 2005.

* cited by examiner

SENSOR MODULE AND MOTOR COMPRISING SAME

CROSS-REFERENCE TO RELATED APPLICATIONS

This application is a Continuation of copending application Ser. No. 15/115,216, filed on Jul. 28, 2016 and Application No. PCT/KR2015/000976, filed on Jan. 29, 2015, which claims priority under 35 U.S.C. § 119(a) to Application No. 10-2014-0011782, filed in Korea on Jan. 29, 2014, all of which are hereby expressly incorporated by reference into the present application.

TECHNICAL FIELD

The present invention relates to a sensor module capable of accurately detecting a rotor position.

BACKGROUND ART

Generally, a rotor in a motor rotates by electromagnetic interaction with a stator. Here, a rotating shaft inserted in the rotor also rotates to generate a rotation driving force.

A sensor module including a magnetic device is disposed inside the motor. The magnetic device identifies a current position of the rotor by sensing a magnetic force of a sensing magnet installed to be interlocked with rotation of the rotor.

Generally, a sensor module includes a sensing plate which rotates in conjunction with a rotating shaft, and a sensing magnet attached to the sensing plate. The sensing magnet may be fixed to the sensing plate using an adhesive, etc.

However, when adhesive strength is weakened between the sensing magnet and the sensing plate due to heat or an impact, a problem in which a rotor position may not be accurately detectable due to relative rotation of the sensing magnet occurs.

DISCLOSURE

Technical Problem

The present invention is directed to providing a sensor module in which slip between a sensing magnet and a sensing plate is prevented, and a motor including the sensor module.

Technical Solution

One aspect of the present invention provides a sensor module, which includes: a sensing plate having a protrusion part formed at one side in a polygonal shape, and a first insertion hole formed at the protrusion part and coupled by the rotating shaft; and a sensing magnet having a second insertion hole formed to correspond to the polygonal shape for the protrusion part to be fixedly inserted therein.

The sensing magnet in which the second insertion hole is formed in the center may include a main magnet which has an inner side surface in a polygonal shape, and the main magnet may include a plurality of segmented magnets having identical areas.

The plurality of segmented magnets may be formed to be symmetrical to each other with respect to a virtual axis extending from facing surfaces facing each other.

A width of the plurality of segmented magnets between the outer side surfaces and inner side surfaces may change in a circumferential direction.

A corner of the polygonal shape may have curvature.

The sensing magnet may include a plurality of sub-magnets disposed at edges.

The sensor module may include a magnetic device which detects a change in magnetic flux according to rotation of the sensing magnet.

Another aspect of the present invention provides a motor, which includes: a housing; a stator disposed in the housing; a rotor rotatably disposed in the stator; a rotating shaft rotating in conjunction with the rotor; and a sensor module, wherein the sensor module includes a sensing plate having a protrusion part formed at one side in a polygonal shape and a first insertion hole formed at the protrusion part and is coupled by the rotating shaft, and a sensing magnet having a second insertion hole formed to correspond to the polygonal shape so that the protrusion part is fixedly inserted therein.

MODES OF THE INVENTION

As the present invention is amenable to various modifications and alternative forms of embodiments, a certain particular embodiment will be described in connection with the drawings.

However, it should be understood that the intention is not to limit the invention to the particular embodiments described. The intention is to cover all modifications, equivalents, and alternatives falling within the technical spirit and scope of the invention.

It should be understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, it should be understood that accompanying drawings are illustrated to be enlarged or contracted for convenience of description.

Hereinafter, embodiments of the present invention will be described in detail with reference to the accompanying drawings, and like or corresponding elements are designated by the same reference numerals regardless of drawing numbers, and duplicated descriptions thereof will be omitted.

Figure 1:
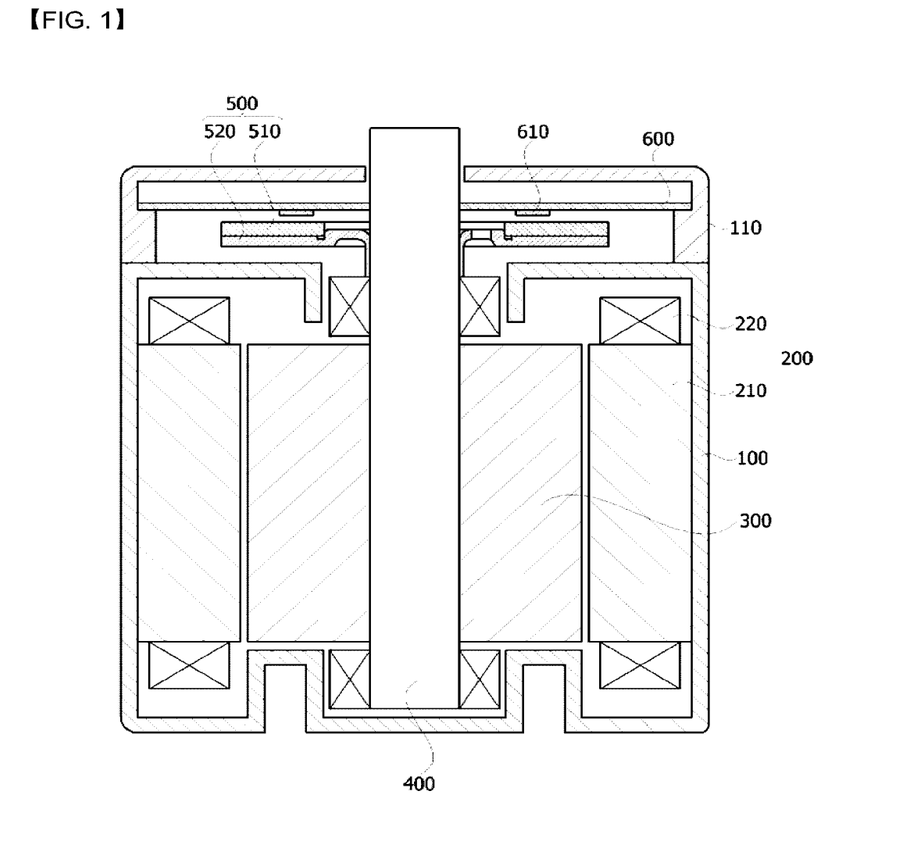
FIG. 1 is a conceptual diagram of a motor according to one embodiment of the present invention.

FIG. 1 is a conceptual diagram of a motor according to one embodiment of the present invention.

Referring to FIG. 1, a motor according to one embodiment of the present invention includes a housing 100, a stator 200 disposed inside the housing 100, a rotor 300 rotatably disposed in the stator 200, and a rotating shaft 400 inserted to pass through the rotor 300 and rotating in conjunction therewith.

The housing 100 is formed in a cylindrical shape to provide a space in which the stator 200 and the rotor 300 may be installed. Here, a shape or material of the housing 100 may be diversely modified, but a metal material which can withstand a high temperature may be selected.

The housing 100 is coupled to a cover 110 to shield the stator 200 and the rotor 300 from the outside. In addition, the housing 100 may further include a cooling structure (not shown) so that inside heat may be easily radiated. An air-cooled or water-cooled structure may be chosen as the cooling structure, and a shape of the housing 100 may be properly modified depending on the cooling structure.

The stator 200 is inserted into an internal space of the housing 100. The stator 200 includes a stator core 210 and a coil 220 wound around the stator core 210. The stator core 210 may be an integrated core formed in a ring shape or a core in which a plurality of segmented cores are coupled.

The stator 200 may be properly modified depending on motor types. For example, a coil may be wound around an integrated stator core in the case of a direct current (DC) motor, and may also be made so that each of U, V, and W phases is input to a plurality of coils in the case of a three-phase control motor.

The rotor 300 is disposed to be rotatable with the stator 200. The rotor 300 to which a magnet is installed rotates by electromagnetic interaction with the stator 200.

The rotating shaft 400 is coupled to the center of the rotor 300. Accordingly, the rotating shaft 400 also rotates when the rotor 300 rotates. Here, the rotating shaft 400 is supported by a first bearing disposed at one side thereof and a second bearing disposed at the other side.

The rotating shaft 400 is coupled to an external mechanical device to provide power. For example, in the case of an electronic power steering (EPS) motor, the rotating shaft 400 may be connected to a steering shaft of a vehicle to provide power for supplementing the steering.

A sensor module 500 detects a rotation position of the rotor 300 by detecting a change in magnetic flux of a sensing magnet 510 which rotates in conjunction with the rotating shaft 400. A magnetic device 610 disposed on a printed circuit board 600 and separately disposed from the sensing magnet 510 may calculate a rotation angle according to the change in magnetic flux. The magnetic device 610 may be a Hall integrated circuit (Hall IC).

Figure 2:
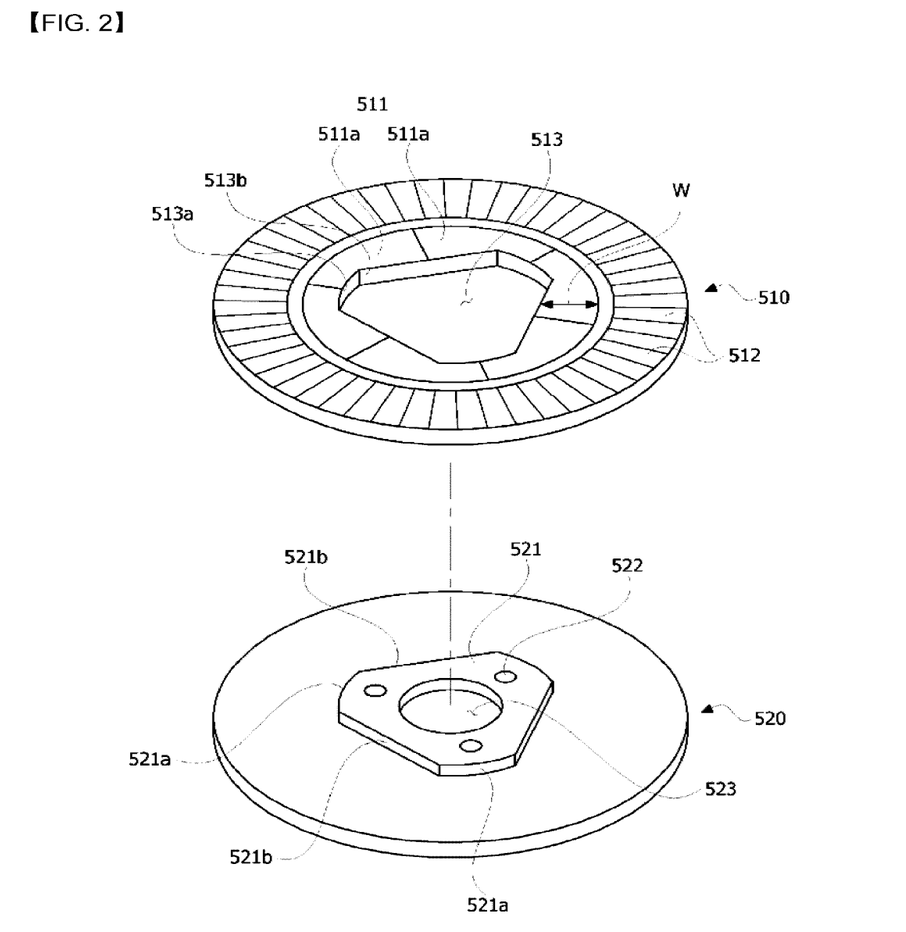
FIG. 2 is an exploded perspective view of a sensor module according to one embodiment of the present invention.
Figure 3:
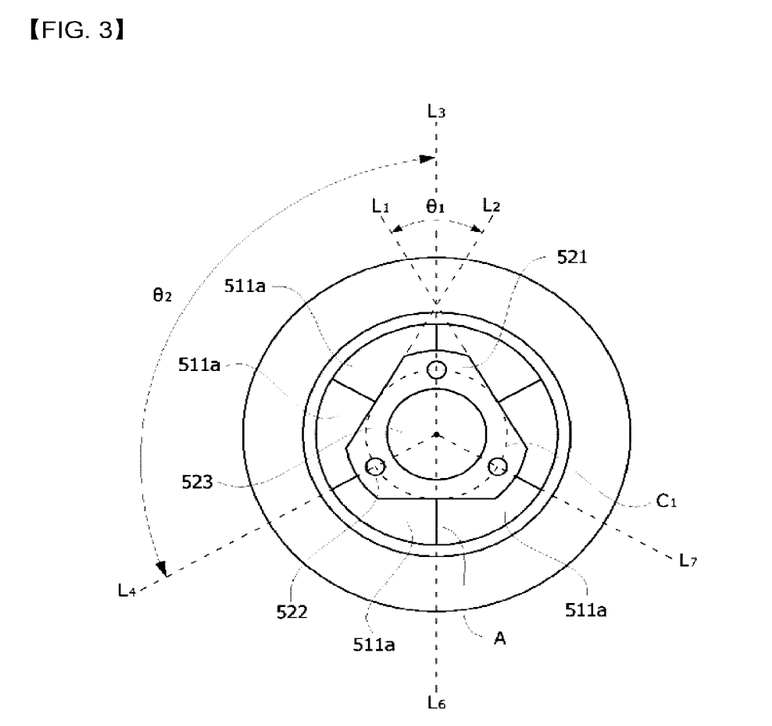
FIG. 3 is a plan view of a sensor module according to one embodiment of the present invention.
Figure 4:
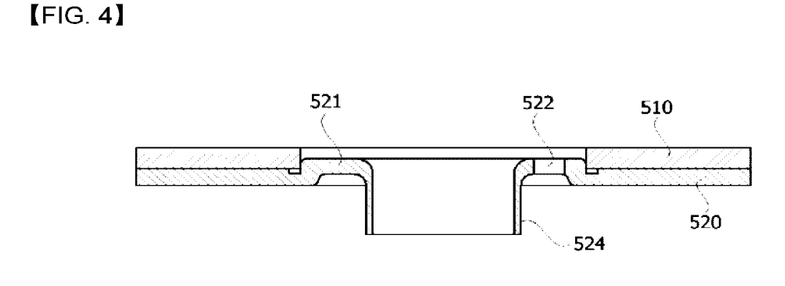
FIG. 4 is a cross-sectional view of a sensor module according to one embodiment of the present invention.
Figure 5:
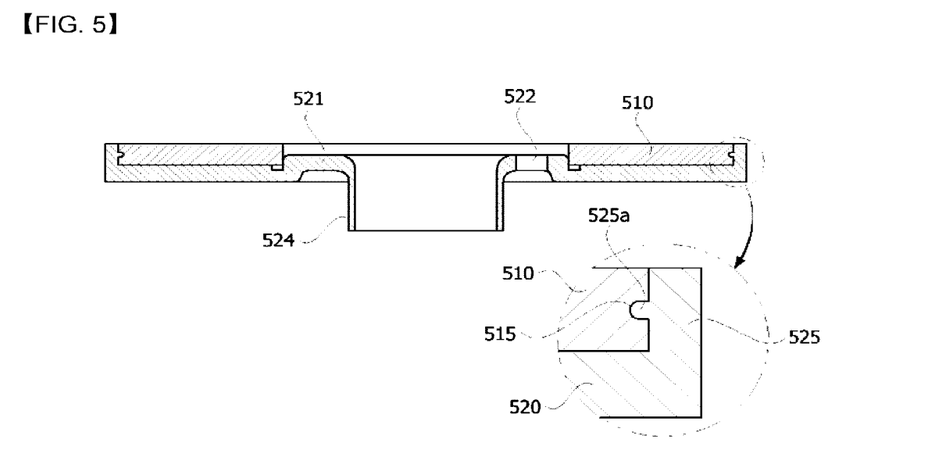
FIG. 5 is a modified example of FIG. 4.

FIG. 2 is an exploded perspective view of a sensor module according to one embodiment of the present invention, FIG. 3 is a plan view of a sensor module according to one embodiment of the present invention, FIG. 4 is a cross-sectional view of a sensor module according to one embodiment of the present invention, and FIG. 5 is a modified example of FIG. 4.

Referring to FIG. 2, a sensor module according to the present invention includes a sensing plate 520 coupled to the rotating shaft and integrally rotating therewith, and the sensing magnet 510 having a second insertion hole 513 into which a protrusion part 521 of the sensing plate 520 is inserted.

The sensing plate 520 is formed in a disk shape and the protrusion part 521 is formed at the center of one surface thereof. For example, the protrusion part 521 may be formed in the shape of a triangular prism which includes three side surfaces 521b and three corners 521a. In addition, the corners 521a may be formed in a rounded shape having predetermined curvature for facilitating a manufacturing process and preventing damage due to an impact. However, a polygonal shape of the protrusion part 521 is not necessarily limited thereto, and any shape having a plurality of sides and corners such as a triangle, a tetragon, a pentagon, a hexagon, an octagon, or the like may be applied thereto.

A first insertion hole 523 into which the rotating shaft is inserted is formed to penetrate through the center of the protrusion part 521 in a thickness direction. A plurality of projections (not shown) may be formed at an inner circumferential surface of the first insertion hole 523 so that an end of the rotating shaft is fitted and integrally rotated therewith. A plurality of through holes 522 for alignment may be formed at the protrusion part 521.

The sensing magnet 510 is formed in a disk shape corresponding to the shape of the sensing plate 520, and includes a main magnet 511 disposed in the center thereof, a sub-magnet 512 disposed at an edge, and a second insertion hole 513 formed in the center of the main magnet 511.

The main magnet 511 includes a plurality of segmented magnets 511a formed in the shape of a segmented ring. The number of the segmented magnets 511a (the number of poles) are arranged to be equal to the number of rotor magnets (the number of poles) to detect rotation of the rotor.

Since the second insertion hole 513 is formed at the center of the main magnet 511, inner side surfaces 513a and 513b of the main magnet 511 have shapes corresponding to the protrusion part 521, the side surfaces 521b, and the corners 521a. Therefore, since the inner side surfaces of the plurality of segmented magnets 511a have shapes different from each other while outer side surfaces have identical curvature, widths W of the plurality of segmented magnets 511a between the outer side surfaces and inner side surfaces may consecutively change in a circumferential direction.

In a conventional main magnet, a width of the main magnet is formed to be the same even when an insertion hole is formed in a polygonal shape, whereas the present invention is different in that the width W of the magnet in a circumferential direction changes since the inner side surface of the main magnet 511 is formed differently from the outer circumference.

All the segmented magnets 511a according to the present invention are made to have identical areas. If the area of each of the segmented magnets 511a is different, a problem in which the rotor position may not be accurately detected because sensing levels of the magnetic devices become different from each other occurs.

The sub-magnets 512 are disposed at edges of the disk at a greater number (the number of poles) than the main magnets 511. Accordingly, one pole of the main magnets 511 (segmented magnet) is further divided into small pieces. Therefore, detection of a rotation amount may be more accurately measured.

Referring to FIG. 3, the plurality of segmented magnets 511a are formed to be symmetrical to each other with respect to virtual axes L3, L4, L6, and L7 extending from facing surfaces facing each other. For example, neighboring segmented magnets 511a are formed to be symmetrical to each other with respect to a sixth virtual axis L6 which extends from facing surfaces A neighboring and facing each other.

An apex angle θ1 formed by virtual axes L1 and L2 which extend neighboring inner side surfaces of the polygonal shapes may be disposed to be about 60°, and an angle θ2 between the virtual axes L3 and L4 which extend from each of the corners may be disposed to be about 120°. In addition, a virtual circle C1 which connects the through holes 522 may be disposed to be greater than a size of the first insertion hole 523 and in contact with the polygonal shape.

Referring to FIG. 4, in the present invention, an attractive force acts between the sensing magnet 510 and the sensing plate 520 which is made of a metal material while the sensing magnet 510 is fitted to the protrusion part 521 of the sensing plate 520, thereby having sufficient bonding strength therebetween. However, an adhesive layer may be formed, as needed, at a portion at which the sensing plate 520 is in contact with the sensing magnet 510. The sensing plate 520 includes a holder 524 which protrudes toward the other surface. Therefore, a coupling area between the rotating shaft and the sensing plate 520 becomes large as the rotating shaft is fitted into the holder 524.

As illustrated in FIG. 5, the sensing plate 520 may further include a side surface 525 which covers an outer side surface of the sensing magnet 510, and projections 525a are formed at the side surface 525 and may be elastically coupled with grooves 515 formed at the outer side surface of the sensing magnet 510. According to the structure, a binding force of the sensing plate 520 and the sensing magnet 510 may be further increased.

Figure 6:
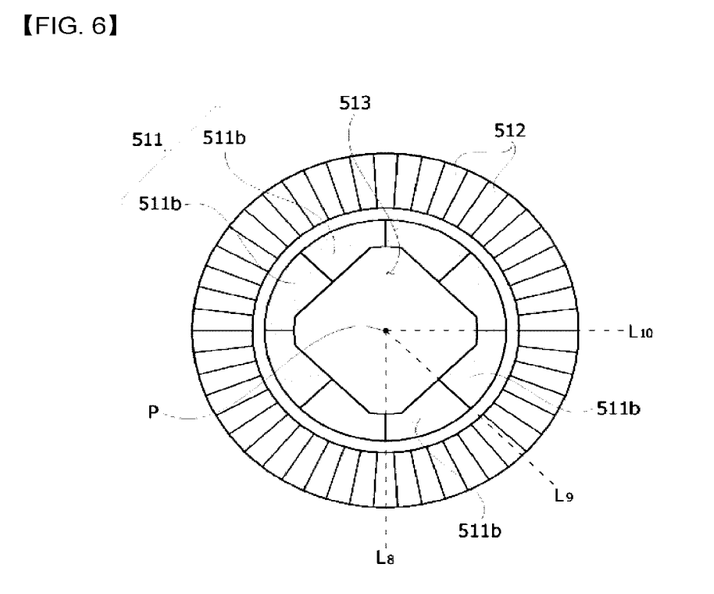
FIGS. 6 and 7 are views for describing various types of sensing magnets of the present invention.
Figure 7:
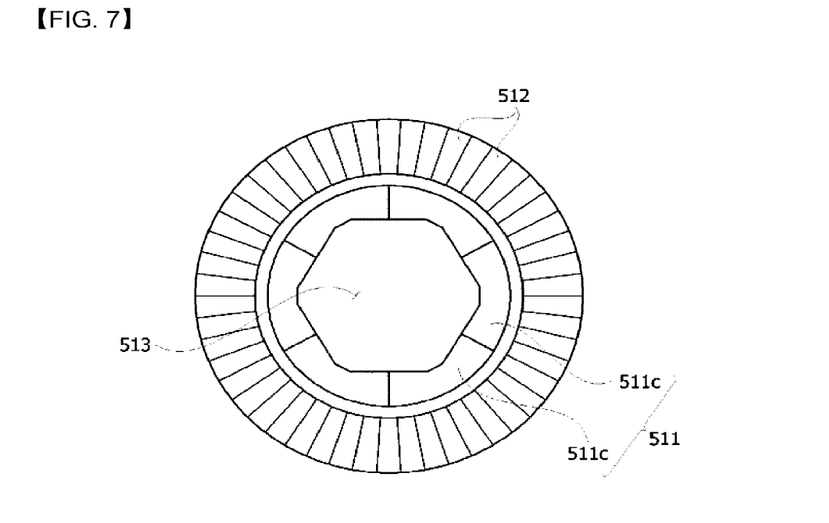

FIGS. 6 and 7 are views for describing various shapes of sensing magnets of the present invention.

The second insertion hole 513 of the sensing magnet 510 may be modified to a tetragonal shape in which corners are rounded as illustrated in FIG. 6, and may also be formed in a hexagonal shape as illustrated in FIG. 7. That is, any of diverse polygonal shapes which can prevent slip of the sensing magnet 510 from the sensing plate 520 when rotating may be applied to the second insertion hole 513.

Referring to FIG. 6, segmented magnets 511b neighboring each other are formed to be symmetrical to each other with respect to virtual axes L8, L9, and L10 which extend from facing surfaces facing each other. Accordingly, all the segmented magnets 511b may be formed to have identical areas.

According to one embodiment of the present invention, an accurate position of the rotor can be detected because the slip of the sensing magnet from the sensing plate is prevented.

In addition, it is advantageous in that a manufacturing process is simplified because a bonding process of the sensing magnet and the sensing plate is omitted.

The invention claimed is:

1. A sensor module comprising:
a sensing plate including a side surface extending in a first direction from a first side thereof, the side surface of the sensing plate including a plurality of projections extending radially inwardly toward a center of the sensing plate; and
a sensing magnet disposed on the first side of the sensing plate,
wherein the side surface of the sensing plate covers an outer surface of the sensing magnet, the outer surface of the sensing magnet having a circumferential shape,
wherein the sensing plate includes a protrusion part disposed at the first side, the protrusion part having a polygonal shape and including a first insertion hole,
wherein the sensing magnet includes:
a plurality of grooves disposed at the outer surface of the sensing magnet; and
an inner surface having a polygonal shape corresponding to the polygonal shape of the protrusion part,
wherein each of the plurality of projections is elastically coupled with a respective one of the plurality of grooves of the sensing magnet,
wherein the sensing plate and the sensing magnet are comprised of metal and are attached to one another via a magnetic force,
wherein the sensing magnet comprises a main magnet including a second insertion hole disposed at a center of the main magnet and forming the polygonal shaped inner surface of the sensing magnet,
wherein the main magnet includes a plurality of segmented magnets having identical areas, and
wherein a width of the plurality of segmented magnets between an outer side surface and the inner surface changes in a circumferential direction.

2. The sensor module of claim 1, wherein the sensing magnet includes a plurality of sub-magnets disposed at an outer edge of the sensing magnet.

3. The sensor module of claim 2, wherein the plurality of segmented magnets are formed to be symmetrical with respect to facing surfaces facing each other.

4. The sensor module of claim 2, wherein a corner of the polygonal shape has curvature.

5. The sensor module of claim 1, wherein the sensing plate comprises a plurality of through holes disposed on the protrusion part, and wherein the plurality of through holes is disposed on a virtual circle in contact with the second insertion hole.

6. A sensor module comprising:
a sensing plate including a side surface extending in a first direction from a first side thereof, the side surface of the sensing plate including a plurality of projections extending radially inwardly toward a center of the sensing plate; and
a sensing magnet disposed on the first side of the sensing plate,
wherein the side surface of the sensing plate covers an outer surface of the sensing magnet, the outer surface of the sensing magnet having a circumferential shape,
wherein the sensing plate comprises:
a protrusion part disposed at the first side of the sensing plate, the protrusion part including a first insertion hole; and
a plurality of through holes disposed on the protrusion part,
wherein the sensing magnet includes:
a plurality of grooves disposed at the outer surface of the sensing magnet, each of the plurality of grooves engaging a respective projection of the side surface of the sensing plate; and
a second insertion hole provided at an inner surface of the sensing magnet, and
wherein the plurality of through holes is disposed on a virtual circle in contact with the second insertion hole.

7. The sensor module of claim 6, wherein the protrusion part has a polygonal shape, and
wherein the second insertion hole has a polygonal shape corresponding to the polygonal shape of the protrusion part.

8. The sensor module of claim 7, wherein the sensing magnet includes a main magnet with an inner surface in the polygonal shape forming the inner surface of the sensing magnet, wherein the sensing magnet further includes a plurality of sub-magnets disposed at an outer edge of the sensing magnet, and wherein the main magnet includes a plurality of segmented magnets having identical areas.

9. The sensor module of claim 8, wherein the plurality of segmented magnets are formed to be symmetrical with respect to facing surfaces facing each other.

10. The sensor module of claim 9, wherein a width of the plurality of segmented magnets between an outer side surface of the main magnet and the inner surface changes in a circumferential direction.

11. The sensor module of claim 8, wherein a corner of the polygonal shape has curvature.

12. A motor comprising:
a housing;
a stator disposed in the housing;
a rotor disposed in the stator;
a rotating shaft rotating in conjunction with the rotor; and
a sensor module disposed on the rotating shaft,
wherein the sensor module comprises:
   a sensing plate including a side surface extending in a first direction from a first side thereof, the side surface of the sensing plate including a plurality of projections extending radially inwardly toward a center of the sensing plate; and
   a sensing magnet disposed on the first side of the sensing plate,
wherein the side surface of the sensing plate covers an outer surface of the sensing magnet, the outer surface of the sensing magnet having a circumferential shape,
wherein the sensing plate includes a protrusion part disposed at the first side, the protrusion part having a polygonal shape and including a first insertion hole,
wherein the sensing magnet includes:
   a plurality of grooves disposed at the outer surface of the sensing magnet; and
   an inner surface having a polygonal shape corresponding to the polygonal shape of the protrusion part,
wherein each of the plurality of projections is elastically coupled with a respective one of the plurality of grooves of the sensing magnet,
wherein the inner surface of the sensing magnet is a second insertion hole,
wherein the sensing plate comprises a plurality of through holes disposed on the protrusion part, and
wherein the plurality of through holes is disposed on a virtual circle in contact with the second insertion hole.

13. The motor of claim 12, wherein the second insertion hole is configured to receive the protrusion part.

14. The motor of claim 13, wherein the rotating shaft is inserted into the first insertion hole of the sensing plate.

15. The motor of claim 14, wherein the sensing magnet includes a main magnet with an inner surface in the polygonal shape forming the inner surface of the sensing magnet, wherein the sensing magnet further includes a plurality of sub-magnets disposed at an outer edge of the sensing magnet, and wherein the main magnet includes a plurality of segmented magnets having identical areas.

16. The motor of claim 15, wherein the plurality of segmented magnets are formed to be symmetrical with respect to facing surfaces facing each other.

17. The motor of claim 16, wherein a width of the plurality of segmented magnets between an outer side surface of the main magnet and the inner surface changes in a circumferential direction.

* * * * *